3,186,851
FLUID SHORTENING COMPOSITION
Norman Bratton Howard, Hamilton, and Paul Martin Koren, Cincinnati, Ohio, assignors to The Procter & Gamble Company, Cincinnati, Ohio, a corporation of Ohio
No Drawing. Filed May 22, 1962, Ser. No. 196,603
11 Claims. (Cl. 99—123)

This invention relates to novel shortening compositions. More particularly, it relates to a fluid shortening which is capable of producing good quality tender cakes and stable cream icings, under commercial conditions, which are equal to or better than those prepared with a conventional plastic shortening.

In commercial bakeries, plastic shortening has been used for baking cakes and preparing cream icings. This practice has been necessary since the conventional liquid shortenings do not produce good quality cream icings and cannot be used for baking all the wide variety of cakes made by a commercial bakery. However, fluid shortenings have a definite advantage in handling and storage, and a fluid product which would perform satisfactorily for both the baking of cakes and the preparation of cream icings for these cakes would be extremely useful in commercial bakeries.

Accordingly, it is a primary object of this invention to provide a versatile fluid shortening which is capable of producing a wide variety of good quality cakes in addition to excellent cream icings.

Other objects and advantages will be evident from the following detailed description of the invention.

In general, the fluid shortening composition of this invention comprises a normally liquid triglyceride oil containing as additives therein from about 0.5% to about 8% of monoester of propylene glycol and saturated fatty acid having from about 14 to about 22 carbon atoms; from about 0.5% to about 10% saturated fatty acid having from about 14 to about 22 carbon atoms; and from about 1% to about 9% of material selected from the group consisting of the condensation products of saturated fatty acid having from about 14 to about 22 carbon atoms and monohydroxy-monocarboxylic acid having from 2 to 6 carbon atoms and the alkali metal and alkaline earth metal salts of said condensation products. All percentages mentioned herein are by total weight of the shortening composition.

It has now been discovered that when the aforesaid monohydroxy-monocarboxylic acid condensates are incorporated into a conventional plastic-type shortening, there is essentially no improvement in cream icing performance, whereas marked improvement is obtained with the liquid shortenings described herein.

The so-called "cream"-type icings described herein generally consist of about 10% to about 30% fat in combination with other ingredients, primarily powdered sugar and milk. They are aerated icings which presumably aerate principally through the extension of a fat film, although the protein film may be similarly extended. They can be distinguished from other aerated icings which aerate generally through the extension of a protein film, such as a marshmallow or egg white icing, or the so-called "flat" icings which are not aerated. The degree of aeration of the cream icings described herein is indicated by the specific volume of the icing.

Heretofore the plastic fats have been used in cream icing operations primarily because the cream icing must have a plastic consistency and remain sufficiently firm at the normal temperatures to which the cake and icing will be exposed. The conventional liquid shortenings have been unable to impart such plastic firmness and body to the icing.

While the ordinary fat emulsifiers such as mono- and diglyceride generally improve the cream icing performance of a plastic fat, they do not significantly affect the cream icing performance of liquid shortenings. However, with the use of the additive combination described herein air incorporation is promoted and excellent cream icings having good volume and firmness can be prepared from a fluid shortening without loss of the desirable cake baking qualities of the conventional plastic shortenings.

The base oil of the fluid shortening of this invention is a normally liquid triglyceride. Suitable base oils for this invention can be derived from animal, vegetable, or marine sources including naturally-occurring liquid triglyceride oils such as cottonseed oil, soybean oil, rapeseed oil, safflower oil, sesame seed oil, sunflower seed oil, and sardine oil. Also, suitable liquid oil fractions can be obtained from palm oil, lard and tallow, as for example, by fractional crystallization or directed interesterification, followed by separation of the oil. Oils predominating in glycerides of unsaturated acids may require partial hydrogenation to maintain flavor, but care should be taken not to greatly increase the amount of glycerides melting between 60° F. and 100° F. When the oil has too many solids melting between 60° F. and 100° F., it may be necessary to separate out at least a part of these solids. It is preferable, although unnecessary in achieving the improved icing performance of this invention, to form the shortening composition so that it is substantially free from these intermediate melting solids. Refined cottonseed oil and refined and partially hydrogenated soybean oil (I.V. of about 110±10) have proved very suitable for use as glyceride base oils of this invention.

The percentage limits of the additives incorporated in the base oil of this invention are determined by various considerations. There should be dissolved in the normally liquid triglyceride oil from about 0.5% to about 8% propylene glycol monoester of saturated fatty acid having from about 14 to about 22 carbon atoms. This additive aids in the incorporation of air during mixing and facilitates single-stage batter mixing whereby all the ingredients of almost any cake recipe can be mixed together in a single step and baked into an acceptable cake.

The said propylene glycol monoester can be prepared by direct esterification or interesterification of propylene glycol by reaction with the desired fatty acid or a fatty ester of monohydric or polyhydric alcohol under appropriate conditions of temperatures, either with or without catalyst and/or solvent. The propylene glycol monoester can also be prepared by reacting appropriate proportions of substantially completely hydrogenated triglycerides and propylene glycol in the presence of interesterification catalyst at elevated temperatures. In the latter case, the reaction product will include, in addition to the propylene glycol monoester, a portion of propylene glycol diester, free fatty acid, monoglyceride, and other materials. This reaction mixture can be used itself as part or all of the source of the propylene glycol monoester and free fatty acid required in the shortening, as well as a source or monoglyceride which is also preferably included in the shortening.

There should also be present in the shortening from about 0.5% to about 10% saturated free fatty acid having from about 14 to about 22 carbon atoms. This additive not only improves the effectiveness of the propylene glycol monoester and mono- or diglyceride emulsifiers in increasing the air incorporation during the mixing step, but also acts as a high temperature batter stabilizer which prevents loss of air during the baking step and shrinkage subsequent to baking of the cake.

The free fatty acids can be obtained from hydrogenated glycerides by saponification, acidulation, and isolation procedures. The fatty acid desired determines the choice of glyceridic material. For example, hydrogenated soybean oil would yield substantial amounts of stearic acid and hydrogenated rapeseed oil would yield substantial amounts of behenic acid. Other examples of fatty acids which can be used in the practice of this invention are myristic acid, palmitic acid, and arachidic acid.

The shortening of this invention also comprises from about 1% to about 9% of material selected from the group consisting of the condensation products of saturated fatty acid having from about 14 to about 22 carbon atoms and monohydroxy-monocarboxylic acid having 2 to 6 carbon atoms and the alkali metal and alkaline earth metal salts of said condensation products. This additive is essential to provide the cream icing performance of the liquid shortening of this invention. Examples of these condensation products which can be used in the practice of this invention are palmitoyl glycolic acid, stearoyl lactic acid, behenoyl hydracrylic acid, sodium stearoyl lactic acid, and stearoyl 4-hydroxy butanoic acid.

As used herein, the term "condensation product" is intended to cover the reaction product in which ester groups form as a result of the reaction of the recited components. It is intended to include monomeric, as well as polymeric, materials having the moiety of from 1 to about 6, and preferably from 1 to 3, mols of the monohydroxy-monocarboxylic acid and the moiety of 1 mol of the saturated fatty acid.

A particularly effective method for preparing the fatty acyl condensation product of a monomeric short chain monohydroxy-monocarboxylic acid comprises the oxidation of an appropriate diol ester. For example, 1,3-propanediol monostearate is readily oxidizable to stearoyl 3-hydroxypropanoic acid. The oxidation can be carried out by a variety of procedures. To illustrate, a simple and effective procedure for the preparation of stearoyl 4-hydroxybutanoic acid comprises the following steps: 36 parts by weight of 1,4-butanediol monostearate are dissolved in 600 parts by weight of 1:1 glacial acetic acid and ethyl acetate to form Solution A; 26 parts by weight of sodium permanganate are dissolved in 300 parts by weight of glacial acetic acid to form Solution B; Solution B is then added to Solution A with sufficient stirring and cooling to maintain the temperature in the range of 20° to 30° C.; after the complete mixing of the two solutions, the resulting precipitate is filtered and washed with warm hexane; the combined filtrate and hexane wash is water washed, the hexane phase is recovered, and the stearoyl 4-hydroxybutanoic acid is crystallized out in a yield of about 70%. In the above procedure, it is advantageous to use ethyl ether as a partial or complete substitute for the hexane when recovering some of the higher melting, less soluble fatty acyl esters of the monohydroxy-monocarboxylic acids.

A method for the preparation of fatty acyl derivatives of monohydroxy-monocarboxylic acids is described in U.S. Patent 2,251,695, granted to Tucker, August 5, 1941, while a further method for preparing the fatty acyl esters of polymeric lactic acids, in particular, is described in U.S. Patent 2,789,992, granted to Thompson and Buddemeyer, April 23, 1957.

As particularly useful condensation products for cream icing performance in the fluid shortening of this invention, there can be mentioned stearoyl polylactic acid, stearoyl glycolic acid, and stearoyl hydracrylic acid. As used herein, unless otherwise specified, the term "stearoyl polylactic acid" refers to the condensation product of one mol of stearic acid and a polylactic acid containing the moiety of an average of from more than one to about six mols of lactic acid. The dimeric condensate of the said reactants, in particular, is herein referred to as stearoyl lactyl lactic acid.

It is also desirable, but not essential for the improved cake and icing performance of this invention, to include in the shortening from about 1% to about 5% normally solid triglyceride fat. Similarly, it is also desirable, but not essential, to include in the shortening about 0.05% to about 5% of partial ester of glycerine and saturated fatty acid, such as monostearin and distearin. These two additives can be either pure esters of fatty acids having from about 14 to about 22 carbon atoms, or mixtures of fatty acid esters containing such fatty acids. The upper limits are set by the viscosity, stability, and consistency requirements of the product.

The said solid triglyceride and partial glycerides, if present, preferably are at least 80% in a beta phase, as opposed to an alpha phase or a beta-prime phase. These crystalline structures can be identified by their X-ray diffraction patterns and are described in detail in U.S. Patents 2,521,242 and 2,521,243, granted to Mitchell, September 5, 1950. A beta phase crystalline structure is desirable to enhance the fluidity characteristics of the shortening whereby it promotes the formation of a stable suspension of the undissolved additives in the liquid triglyceride base oil.

Although particular methods of preparing several of the aforesaid additives have been described herein, it is not intended that the invention should be limited to a particular method of preparation of any material.

When the additives of this invention are used in a shortening, the presence of other additives such as the partial fatty acid esters of sucrose, sorbitol, and other polyhydroxy substances is not precluded, since conventional benefits may still be derived by their use. It will be recognized, of course, that the presence of other additives may have an adverse effect on the operation of the additives of this invention and, therefore, the desirability of the use of the other additives will depend upon the overall shortening qualities desired.

Various minor ingredients, such as flavoring, coloring matter, and antioxidants including butylated hydroxy toluene, butylated hydroxy anisole, citric acid, methyl silicone, and the like can also be added if desired.

The additives of this invention can be incorporated in the shortening composition by mixing them into the liquid triglyceride base oil. For the preparation of a stable suspension of the additives in the base oil, it is preferable to process the shortening composition according to the teaching of U.S. Patent 2,815,286, granted to Andre and Going, December 3, 1957. The main steps can include heating the shortening composition to a temperature high enough to melt all the solids, rapidly chilling to form small crystals, and then warming to between 90° F. and 100° F. to promote a change of the solid triglyceride fat from the alpha and beta-prime phases to a beta phase either with or without "seeding" with beta phase crystals. An alternative method is to warm the rapidly chilled mixture to a temperature above the melting point of the alpha and beta-prime phases but below the melting point of the beta phase crystals, and then cooling the mixture, using the beta phase crystals already present as "seed" crystals. An added tempering step for the shortening of this invention of 1 to 2 days at 80° F. to 90° F., after packing, is desirable. This process results in forming a stable suspension of the undissolved additives in the base oil.

The aforesaid methods for forming the shortening composition of this invention are by way of example, and should not be taken as limiting the invention in any way.

A preferred embodiment of the fluid shortening composition of this invention comprises soybean oil hydrogenated to an I.V. of from about 100 to about 120 and having therein, as additives, from about 3% to about 5% propylene glycol monostearate, from about 0.6% to about 5% stearic acid, from about 3% to about 5% stearoyl polyacetic acid containing the moiety of an average of from more than 1 to about 3 mols of lactic acid in the molecule, from about 1% to about 3% substantially completely hydrogenated soybean oil, and from about 3% to about 4% normally solid partial ester of glycerine with the fatty acids of substantially completely hydrogenated soybean oil, said substantially completely hydrogenated soybean oil and said normally solid partial ester being at least 80% in a beta phase and said shortening being substantially free from intermediate melting solids.

All types of layer cakes can be made with the fluid shortening of this invention. White cakes, yellow cakes, chocolate cakes, pound cakes, and many other cakes of good quality can be prepared by simply mixing the shortenings of this invention with the other ingredients of the cake in a single mixing step. Although specific types of cakes have been mentioned, this should in no way be held to limit this invention to the preparation of any specific cake.

The following examples illustrate the shortening composition of this invention, although the invention is not limited to these examples. All percentages mentioned in these examples are by weight of the total shortening composition.

EXAMPLE 1

A fluid shortening was used to prepare an excellent cream icing by mixing together the following ingredients in the stated amounts:

|  | Parts by weight |
|---|---|
| Shortening | 80 |
| Sodium chloride | 2 |
| Non-fat dry milk | 20 |
| Water | 56 |
| 4X powdered sugar | 320 |

The said ingredients were mixed with an electric mixer at slow speed for about 5 minutes and then whipped at medium speed for about 10–15 minutes.

The shortening used in this icing was a stable fluid shortening which consisted of a liquid base oil composed primarily of refined and bleached soybean oil hydrogenated to an I.V. of 107 having therein the following approximate weight percents of additives:

4.8% propylene glycol monostearate
2.5% stearic acid
2.8% stearoyl polylactic acid containing the moiety of an average of more than 1 to about 3 mols of lactic acid in the molecule
2% normally solid substantially completely hydrogenated soybean oil (I.V. 8)
3.2% normally solid partial ester of glycerine with the fatty acids of substantially completely hydrogenated soybean oil (This percent figure includes a minor portion of tristearin and propylene glycol distearate)

The cream icing prepared in the above manner had an excellent specific volume of 1.33 whereas a similar cream icing containing no stearoyl polyactic acid in the shortening component had a poor specific volume of only 0.86. The specific volume of 1.33 compared favorably with the specific volume of 1.31 of an icing obtained when a standard plastic shortening derived from vegetable oil and containing 4.8% mono- and diglyceride was substituted for the above fluid shortening in the aforesaid icing formula.

The fluid shortening of this example can also be used for the preparation of excellent dessert toppings and fillings in addition to tender cakes. Good quality icings are also obtained by using the above fluid shortening in other conventional icing formulae. The shortening in these icings can be in either the continuous of discontinuous phase, depending upon the specific icing formula used.

EXAMPLE 2

Several fluid shortening compositions were prepared by changing the weight percents of the stearolyl polylactic acid and stearic acid used in the fluid shortening composition of Example 1 without changing the weight percents of the other additives. Each of these shortenings was used to prepare a cream icing in accordance with the procedure described in Example 1. White cakes were also prepared from these shortenings by mixing together the following ingredients in the stated amounts.

|  | Parts by weight |
|---|---|
| Shortening | 44 |
| Granulated sugar | 112 |
| Sodium chloride | 3 |
| Baking powder | 4 |
| Cream of tartar | 1 |
| Non-fat dry milk | 8 |
| Cake flour | 80 |
| Egg whites | 54 |
| Whole eggs | 6 |
| Water | 76 |

The liquid shortening and the dry ingredients were placed in a mixing bowl and then the other liquids (water and eggs) were added and mixed in with an electric mixer at low speed for about 1½ minutes. The batter was scraped down in the bowl and mixing was continued at the next highest speed for one minute. 400 g. of the batter were placed in an 8-inch pan and baked in an oven at 370° F. for about 20 minutes.

The weight percents of the stearoyl polylactic acid and stearic acid used in the said shortenings and the cake and icing results obtained therefrom are shown in the following table:

Table I

| Percent additive | | Cream icing, specific volume | Cake volume, cc./lb. | Penetration, 0.1 mm./ 5 secs. |
|---|---|---|---|---|
| Stearoyl polylactic acid | Stearic acid | | | |
| 0 | 1.3 | 0.86 | 1,335 | 273 |
| 2.1 | 2.2 | 1.32 | 1,270 | 268 |
| 4.2 | 3.1 | 1.27 | 1,255 | 261 |
| 6.3 | 4.0 | 1.23 | 1,345 | 263 |
| 8.4 | 4.9 | 1.18 | 1,375 | 263 |

The penetration values in the above and following examples were obtained by placing a standard grease cone (ASTM D–217) on top of the cake and measuring the number of tenths of a millimeter the cone penetrated the cake in five seconds. All measurements were made with a "Precision Penetrometer" (Precision Scientific Company). The penetration value indicates the relative tenderness of the cake, i.e., the higher the value the more tender the cake. The above values obtained with the fluid shortening of this invention represent a substantial improvement over the penetration value of 228 obtained with the same cake baked with a standard plastic shortening.

EXAMPLE 3

A fluid shortening was prepared which was comparable to the shortening of Example 1 except that its content of stearoyl polylactic acid was 4.2% and its content of stearic acid was 3.1%. The cake baking and cream icing performance of this shortening was compared with the performance of several other shortenings, viz., the same fluid shortening cbf Example 1 with 0% stearoyl polylactic acid and 1.3% stearic acid; a standard plastic shortening derived from vegetable oil and containing about 4.8% mono- and diglyceride; the same plastic shortening containing additionally 4.2% stearoyl polyactic acid and 1.8% stearic acid; and soybean oil hydrogenated to an I.V. of 107. The cream icings were prepared in accordance with the procedure described in Example 1. All cakes were baked in accordance with Example 2 except that those cakes made with the plastic shortenings were prepared according to the following formula:

WHITE CAKE

| Ingredients (parts by weight) | Instructions (all mixing is at slow speed) |
|---|---|
| 80 parts flour<br>44 parts shortening | Mix for 3 to 5 minutes, scrape down at least once during this stage. |
| 112 parts sugar<br>3 parts sodium chloride<br>5 parts baking powder<br>1 part cream of tartar<br>32 parts water<br>8 parts non-fat dry milk | Add to the blended mass and mix for 3 to 5 minutes, scraping down at least once. |
| 60 parts egg whites<br>36 parts water | Scale off egg whites and water and add approximately half of it to the bowl. Mix until smooth, scrape down and mix until smooth again. Then add balance of the liquids and continue mixing for a total of 3 to 5 minutes in this stage, scraping down again to insure a smooth batter. |

Place 400 g. of the batter in an 8-inch pan and bake at 370° F. for 20 minutes.

The following table records the cake and icing results obtained with the above shortenings:

Table II

| Shortening | Cream icing, specific volume | Cake volume, cc./lb. | Penetration, 0.1 mm./ 5 sec. |
|---|---|---|---|
| Fluid shortening of Example 1 with 0% stearoyl polylactic acid and 1.3% stearic acid | 0.86 | 1,335 | 273 |
| Fluid shortening of Example 1 with 4.2% stearoyl polylactic acid and 3.1% stearic acid | 1.27 | 1,255 | 261 |
| Standard plastic shortening | 1.35 | 1,275 | 228 |
| Standard plastic shortening with 4.2% stearoyl polylactic acid and 1.8% stearic acid | 1.21 | (*) | (*) |
| Soybean oil (I.V. 107) | 0.80 | 1,115 | 234 |

*Not determined.

The above table shows the improvements in icing volume and cake tenderness obtained with the shortening additives of this invention. It also shows that, while the stearic acid and stearoyl polylactic acid improved the icing volume of a liquid shortening containing the other ingredients of this invention, they had a deteriorative effect upon the icing performance of a conventional plastic shortening.

EXAMPLE 4

Several fluid shortening compositions were prepared by incorporating various proportions of propylene glycol monostearate, stearoyl polylactic acid containing the moiety of an average of from more than 1 to about 3 mols of lactic acid in the molecule, and stearic acid in a liquid base oil consisting primarily of refined and bleached soybean oil hydrogenated to an I.V. of 107. Each of these shortenings was used to prepare a cream icing in the manner of Example 1 and to bake a cake in the manner of Example 2. The weight percents of each additive used in the shortening, and the cake and icing results obtained therefrom are shown in the following table:

The above table shows the enhanced icing volume and firmness obtained with the shortenings of this invention as well as the good quality cakes baked therefrom.

EXAMPLE 5

A cream icing was prepared in the manner of Example 1 except that the amount of stearic acid in the shortening component was 1.3%, and stearoyl glycolic acid in an amount of 4% was substituted for the 2.8% stearoyl polylactic acid in the shortening. The cream icing had a specific volume of 1.32 and was very firm.

EXAMPLE 6

A cream icing was prepared in the manner of Example 1 except that the amount of stearic acid in the shortening component was 3.3%, and stearoyl glycolic acid in an amount of 2% was substituted for the 2.8% stearoyl polylactic acid in the shortening. The cream icing had a specific volume of 1.34 and was very firm.

EXAMPLE 7

A cream icing was prepared in the manner of Example 1 except that the amount of stearic acid in the shortening component was 1.3%, and stearoyl hydracrylic acid having a melting point of 84.6° C. in an amount of 4% was substituted for the 2.8% stearoyl polylactic acid in the shortening. The cream icing had a specific volume of 1.28 and was very firm.

EXAMPLE 8

Example 7 was repeated except that 4% of stearoyl 4-hydroxybutanoic acid having a melting point of 72.4° C. was substituted for the 4% of stearoyl hydracrylic acid. The cream icing had a specific volume of 1.22 and a firm consistency.

EXAMPLE 9

Example 7 was repeated except that 3% of stearoyl 5-pentanoic acid having a melting point of 75.1° C. was substituted for the 4% of stearoyl hydracrylic acid. The cream icing had a specific volume of 1.18.

EXAMPLE 10

Example 7 was repeated except that 4% of stearoyl 6-hexanoic acid having a melting point of 60.6° C. was substituted for the 4% of stearoyl hydracrylic acid. The cream icing had a specific volume of 1.09.

EXAMPLE 11

A cream icing was prepared in the manner of Example 1 except that the amount of stearic acid in the shortening component was 1.3%, and the calcium salt of stearoyl lactyl lactic acid in an amount of 6% was substituted for the 2.8% stearoyl polylactic acid in the shortening. The cream icing had a specific volume of 1.05.

Comparable results are obtained when the sodium and potassium salts of stearoyl lactyl lactic acid are substituted for the calcium salt in the above example.

The shortenings in Examples 5 to 11 can also be used for the baking of good quality single-stage batter mixed cakes.

What is claimed is:

1. A fluid shortening composition, suitable for use in commercial baking and cream icing operations, which Table III

| Percent additive | | | Cream icing | | White cake | |
|---|---|---|---|---|---|---|
| Propylene glycol monostearate | Stearoyl polylactic acid | Stearic acid | Specific volume | Consistency | Volume, cc. | Penetration, 0.1 mm./5 secs. |
| 0 | 2.5 | 2.5 | 1.32 | Very soft | 1,225 | 270 |
| 4 | 0 | 0 | 0.86 | Soupy | 1,340 | 262 |
| 4 | 2.5 | 2.5 | 1.41 | Firm | 1,335 | 276 |
| 4 | 5.0 | 5.0 | 1.25 | Very firm | 1,290 | 270 |
| 8 | 2.5 | 2.5 | 1.26 | Firm | 1,305 | 271 | comprises a normally liquid glyceride oil having therein from about 0.5% to about 8%, by weight of the composition, of monoester of propylene glycol and saturated fatty acid containing from about 14 to about 22 carbon atoms, said shortening composition additionally comprising, by weight of the composition, from about 0.5% to about 10% saturated fatty acid having from about 14 to about 22 carbon atoms, and from about 1% to about 9% of material selected from the group consisting of the condensation products of saturated fatty acid having from about 14 to about 22 carbon atoms and monohydroxymonocarboxylic acid having from 2 to 6 carbon atoms and the alkali metal and alkaline earth metal salts of said condensation products.

2. The shortening composition of claim 1 in which the condensation product is stearoyl polylactic acid containing the moiety of an average of from more than 1 to about 3 mols of lactic acid in the molecule.

3. The shortening composition of claim 1 in which the condensation product is stearoyl glycolic acid.

4. The shortening composition of claim 1 in which the condensation product is stearoyl hydracrylic acid.

5. The shortening composition of claim 1 in which the condensation product is stearoyl 4-hydroxy-butyric acid.

6. The shortening composition of claim 1 in which the condensation product is calcium stearoyl lactyl lactic acid.

7. The composition of claim 1 in which the normally liquid glyceride oil is soybean oil with an I.V. of from about 100 to about 120, the monoester of propylene glycol is monostearate, the fatty acid is stearic acid, and the condensation product is stearoyl polylactic acid containing the moiety of an average of from more than 1 to about 3 mols of lactic acid in the molecule.

8. The composition of claim 1 containing additionally from about 1% to about 5% normally solid triglyceride fat being at least 80% in beta phase.

9. The shortening composition of claim 1 containing additionally from about 1% to about 5% normally solid triglyceride fat and from about 0.05% to about 5% normally solid partial ester of glycerine and substantially saturated fatty acid having from about 14 to about 22 carbon atoms, said additional additives being at least 80% in beta phase.

10. The composition of claim 9 in which the normally liquid glyceride oil is soybean oil with an I.V. of from about 100 to about 120, the monoester of propylene glycol is monostearate, the fatty acid is stearic acid, the condensation product is stearoyl polylactic acid containing the moiety of an average of from more than 1 to about 3 mols of lactic acid in the molecule, the normally solid triglceride fat is substantially completely hydrogenated soybean oil, and the normally solid partial ester contains the fatty acids of substantially completely hydrogenated soybean oil.

11. A stable fluid shortening composition suitable for use in commercial baking and cream icing operations, which comprises soybean oil hydrogenated to an I.V. of from about 100 to about 120, having therein from about 3% to about 5%, by weight of the composition of propylene glycol monostearate, said shortening additionally comprising, by weight of the composition, from 0.6% to about 5% stearic acid, from about 3% to about 5% stearoyl polyactic acid containing the moiety of an average of from more than 1 to about 3 mols of lactic acid in the molecule, from about 1% to about 3% substantially completely hydrogenated soybean oil, and from about 3% to about 4% normally solid partial ester of glycerine with the fatty acids of substantially completely hydrogenated soybean oil, said substantially completely hydrogenated soybean oil and said normally solid partial ester being at least 80% in beta phase and said shortening being substantially free from intermediate melting solids.

References Cited by the Examiner

UNITED STATES PATENTS

| | | | |
|---|---|---|---|
| 2,508,393 | 5/50 | Jaeger | 99—123 |
| 2,746,868 | 5/56 | Cross et al. | 99—123 |
| 2,789,992 | 4/57 | Thompson et al. | 260—410.9 |
| 2,815,286 | 12/57 | Andre et al. | 99—118 |
| 2,868,652 | 1/59 | Brock | 99—118 |
| 2,954,297 | 9/60 | Elsesser et al. | 99—123 X |
| 2,973,270 | 2/61 | Thompson et al. | 99—123 |
| 3,071,472 | 1/63 | Hager et al. | 99—92 X |

A. LOUIS MONACELL, *Primary Examiner.*

ABRAHAM H. WINKELSTEIN, *Examiner.*